United States Patent
Kobayashi et al.

Patent Number: 5,084,106
Date of Patent: Jan. 28, 1992

[54] MONOAZO LAKE PIGMENT

[75] Inventors: Nagatoshi Kobayashi; Hirohito Ando, both of Ibaraki, Japan

[73] Assignee: Dainippon Ink and Chemicals, Inc., Tokyo, Japan

[21] Appl. No.: 137,264

[22] Filed: Dec. 23, 1987

[30] Foreign Application Priority Data

Dec. 24, 1986 [JP] Japan .................. 61-306225

[51] Int. Cl.$^5$ .............................. C09B 63/00
[52] U.S. Cl. ...................... 106/402; 106/496; 534/882; 534/885; 534/886
[58] Field of Search ............... 106/288 Q, 308 Q, 402, 106/497, 496; 534/885, 882, 886

[56] References Cited

U.S. PATENT DOCUMENTS

| | | | |
|---|---|---|---|
| 1,803,657 | 5/1931 | Siegel . | |
| 2,117,860 | 5/1938 | Siegel | 18/50 |
| 2,225,665 | 12/1940 | Siegel | 260/40 |
| 2,791,513 | 5/1957 | Siegel et al. | 106/402 |
| 4,143,036 | 3/1979 | Stefancsik | 260/202 |
| 4,486,237 | 12/1984 | Paffoni et al. | 106/288 Q |

FOREIGN PATENT DOCUMENTS

2432538 2/1980 France .
2510129 1/1983 France .

OTHER PUBLICATIONS

Chemical Abstracts, vol. 80, No. 14, Apr. 8, 1974, p. 74, Abstract No. 72062W, Columbus, Ohio, U.S.; & CS-A-147 169 (J. Dobrovolny et al) 15-01-1973.
Chemical Abstracts, vol. 105, No. 8, Feb. 1987, p. 51802, Abstract No. 51794b, Columbus, Ohio, U.S.; & CS-A-226 132 (F. Muzik et al) 15-04-1986.

*Primary Examiner*—Amelia Burgess Yarbrough
*Attorney, Agent, or Firm*—Armstrong, Nikaido, Marmelstein, Kubovcik & Murray

[57] ABSTRACT

A monoazo lake pigment of the formula (I):

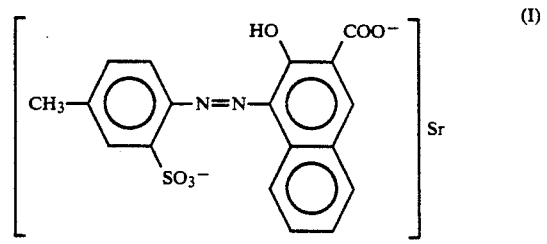

whose X-ray diffraction pattern shows a high diffraction intensity at a diffraction angle ($2\theta \pm 0.2°$; Cu - $K_\alpha$) of 4.9°, moderate diffraction intensities at 18.4°, 25.9° and 26.8° and relatively low diffraction intensities at 11.1°, 15.3° and 21.2°, and printing ink, a paint and plastics in which the monoazo lake pigment is contained.

4 Claims, 2 Drawing Sheets

MONOAZO LAKE PIGMENT

BACKGROUND OF THE INVENTION

Field of the Invention

This invention relates to a novel red monoazo lake pigment which is excellent in various properties including brightness, color strength, gloss, fastness to water and fastness to heat and highly useful in, for example, printing inks, paints, plastics and stationery products.

Description of the Prior Art

A conventional monoazo lake pigment of the following formula (I):

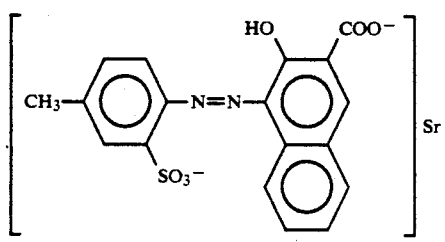

(I)

may be prepared by, for example, coupling a diazo component, which is obtained by diazotizing an amine of the following formula (II):

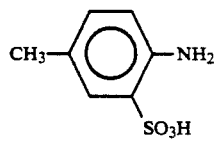

(II)

at a temperature of 5° C. or below, with a coupler component, which is obtained by dissolving an acid of the following formula (III):

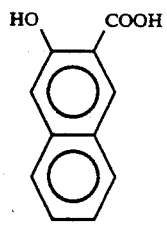

(III)

in an aqueous solution of a caustic alkali metal, at a temperature of 5° C. or below to thereby give a monoazo dye of the following formula (IV):

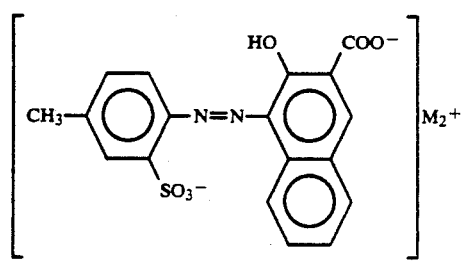

(IV)

wherein $M_2^+$ represents a sodium, potassium or lithium ion;
and then laking the resulting monoazo dye (IV) by adding an aqueous solution of a strontium salt to a suspension of said monoazo dye (IV) and then allowing the obtained mixture to react at a temperature of 5° C. or below.

An X-ray diffraction pattern of the conventional monoazo lake pigment of the formula (I) thus obtained shows a high diffraction intensity at a diffraction angle ($2\theta \pm 0.2°$; Cu—$K_\alpha$) of 5.0; moderate diffraction intensities at 6.4° and 26.4°; and relatively low diffraction intensities at 7.8°, 13.9°, 16.5°, 21.1° and 28.5°.

However the monoazo lake pigment having a crystal form of the above mentioned X-ray diffraction pattern, which will be referred to as $\alpha$ form hereinafter, has not been marketed yet. This is because it is inferior to a presently marketed calcium lake pigment known as C.I. Pigment Red 57:1 in brightness, color strength and gloss when used in a printing ink or a paint; and in fastness to heat when used in coloring plastics, although the former is superior to the latter in fastness to water.

SUMMARY OF THE INVENTION

In order to overcome these disadvantages, we have attempted to convert a monoazo dye of the formula (IV):

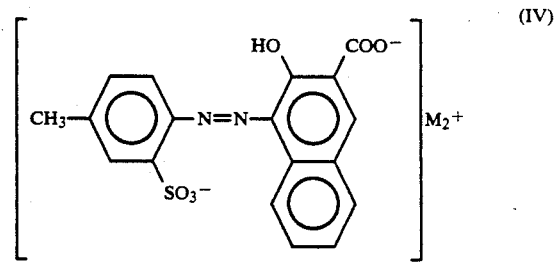

(IV)

wherein $M_2^+$ is as defined above;
into a pigment. As a result, we have found that a pigment having a novel crystal form, which is excellent in various properties including brightness, color strength, gloss, fastness to water and fastness to heat and shows an X-ray diffraction pattern different from those of conventional $\alpha$ form pigments, can be obtained by heating said dye and then laking the same, thus completing the present invention.

Accordingly, the present invention relates to a monoazo lake pigment of the formula (I):

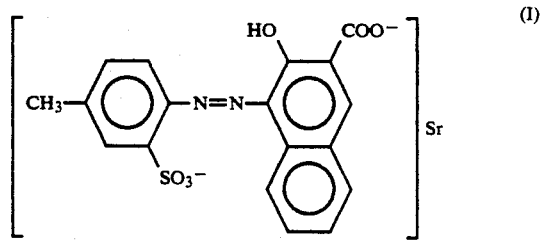

(I)

whose X-ray diffraction pattern shows a high diffraction intensity at a diffraction angle ($2\theta \pm 0.2°$; Cu—$K_\alpha$) of 4.9°; moderate diffraction intensities at 18.4°, 25.9° and 26.8°; and relatively low diffraction intensities at 11.1°, 15.3° and 21.1°.

DETAILED DESCRIPTION OF THE INVENTION

Figure 1:
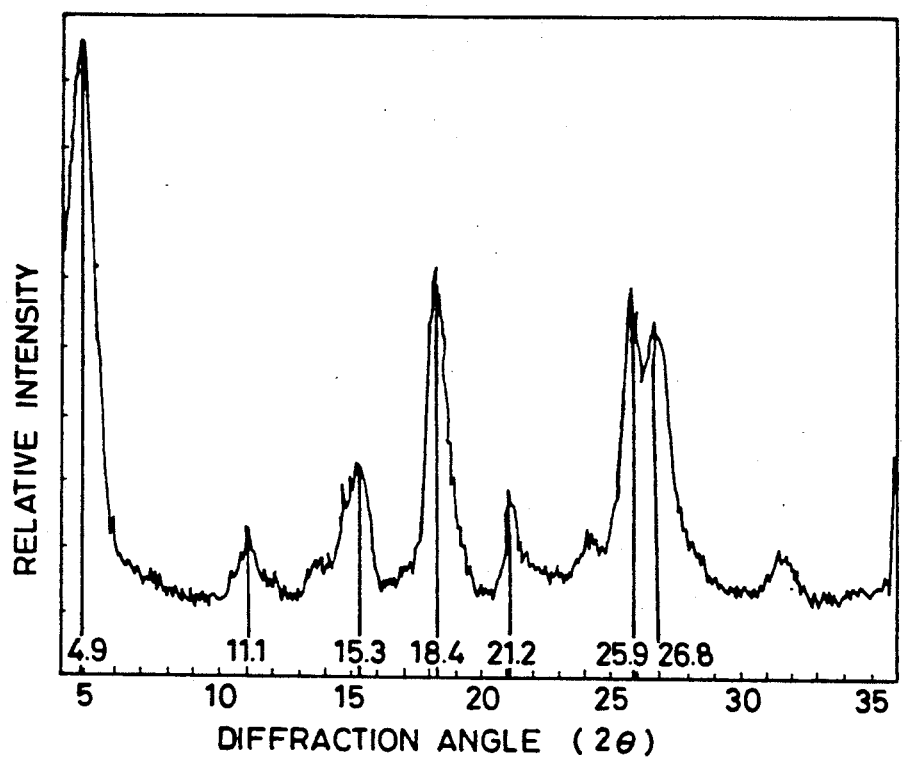
FIG. 1 is an X-ray diffraction pattern ($2\theta \pm 0.2°$; Cu—$K_\alpha$) of the $\beta$ form monoazo lake pigment of the present invention as obtained in Example 1.

The monoazo lake pigment of the present invention, whose crystal form, which will be referred to as $\beta$ form hereinafter, shows an X-ray diffraction pattern completely different from those of conventional $\alpha$ form pigments as described above, may be obtained by, for example, heating a suspension of the monoazo dye of the formula (IV), which is obtained in a conventional manner, usually to a temperature of 20° to 100° C., adding an aqueous solution of a strontium salt thereto and allowing the resulting mixture to react usually at a temperature of $-3°$ to 90° C. thereby laking the same. A particularly preferable process comprises heating said suspension in such a manner as to maintain the same at a temperature of 23° to 40° C. for 2 to 20 minutes, then adding an aqueous solution of a strontium salt thereto and allowing the resulting mixture to react at 0° to 40° C., since a $\beta$ form pigment which is excellent in, for example, brightness, color strength and gloss can be efficiently obtained thereby.

Examples of the strontium salt to be used in the laking step of the present invention include strontium chloride, strontium nitrate and strontium acetate.

Effects of the Invention

When used in, for example, printing inks or paints, the novel $\beta$ form red monoazo lake pigment of the present invention exhibits an excellent brightness, color strength and gloss and is highly fast to water. Further it is highly fast to heat, when employed in coloring plastics.

EXAMPLE

To further illustrate the present invention, and not by way of limitation, the following Examples will be given, wherein all parts and percentages are expressed by weight.

Example 1

20.0 parts of 2-amino-5-methylbenzenesulfonic acid was dispersed in 200 parts of water and 22.0 parts of a 20% aqueous solution of hydrochloric acid was added thereto. The resulting mixture was diazotized by adding 25.1 parts of a 30% aqueous solution of sodium nitrite dropwise thereto while maintaining the resulting mixture at 0° C. to thereby give a diazo solution.

Then 20.6 parts of 2-hydroxy-3-naphthoic acid was dispersed in 242 parts of water at 60° C. and 22.0 parts of a 48% aqueous solution of caustic soda was added thereto to thereby dissolve said acid. The coupler solution thus obtained was cooled to 0° C. and the above mentioned diazo solution was added dropwise thereto under stirring. The resulting mixture was stirred at 0° C. for 60 minutes to thereby complete the coupling. Subsequently, 60 parts of a 10% aqueous solution of sodium rosinate was added thereto and the obtained mixture was stirred for 60 minutes to thereby give a suspension of a monoazo dye.

This dye suspension was heated to 30° C. within 15 minutes and then maintained at this temperature for five minutes. Subsequently a solution obtained by dissolving 42.1 parts of strontium chloride hydride in 150 parts of water was added thereto and the resulting mixture was stirred at 30° C. for 60 minutes. After adjusting the pH value to 7.6, the mixture was stirred for an additional 60 minutes to thereby give a lake product. After the completion of the laking, the reaction mixture was stirred at 80° C. for 60 minutes, hot-filtered, washed with water and then dried at 80° C. Thus 56.7 parts of a yellowish red monoazo lake pigment was obtained in the form of a powder.

Figure 3:
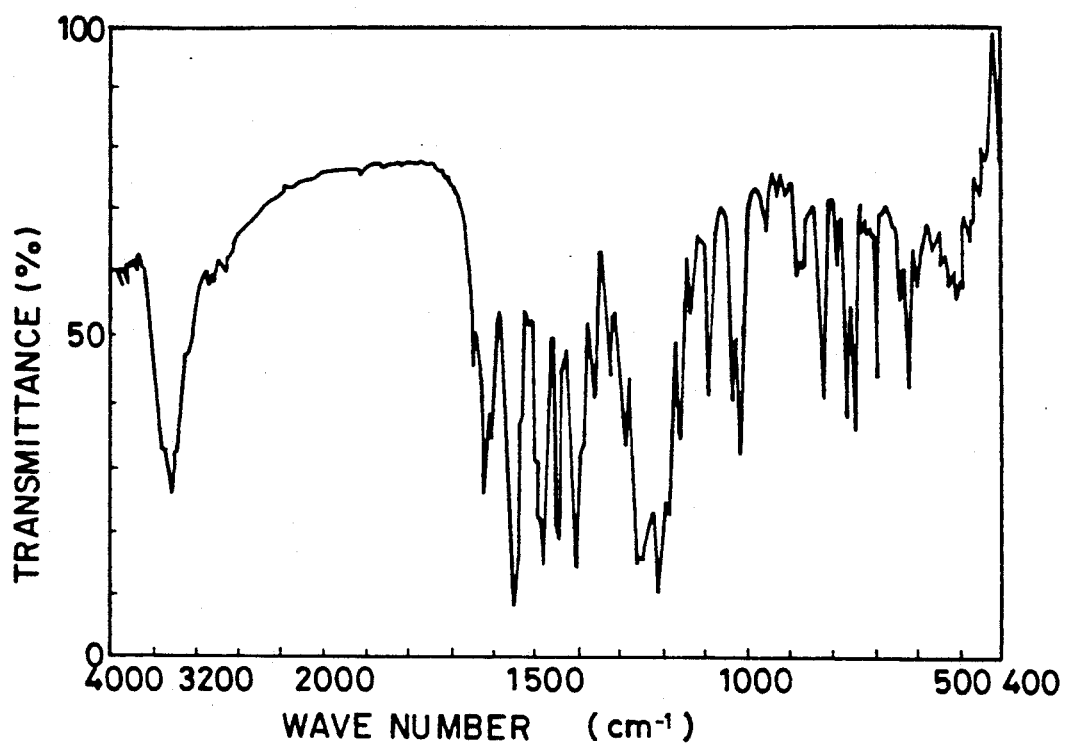
FIG. 3 is an infrared absorption spectrum of the $\beta$ form monoazo lake pigment of the present invention as obtained in Example 1.

As shown in FIG. 1, an X-ray diffraction pattern of this pigment showed a high diffraction intensity at a diffraction angle ($2\theta \pm 0.2°$; $Cu-K_\alpha$) of 4.9°, moderate diffraction intensities at 18.4°, 25.9° and 26.8° and relatively low diffraction intensities at 11.1°, 15.3° and 21.2°. FIG. 3 shows an infrared absorption spectrum of this pigment.

Example 2

The procedure of Example 1 was followed except for the following points. Namely, a dye suspension, which was obtained through a diazo coupling reaction similar to the one as described in Example 1, was heated to 36° C. within 18 minutes and then maintained at this temperature for five minutes. Subsequently it was cooled again to 10° C. and a solution of 33.8 parts of strontium acetate in 200 parts of water was added thereto. The resulting mixture was stirred at 10° C. for 60 minutes. After adjusting the pH value to 7.6, it was further stirred for an additional 60 minutes to thereby complete the laking. Thus 56.4 parts of a yellowish red monoazo lake pigment was obtained in the form of a powder.

An X-ray diffraction pattern of this pigment was similar to that of the pigment as prepared in Example 1.

Example 3

The procedure of Example 1 was followed except for the following points. Namely, a dye suspension, which was obtained through a diazo coupling reaction similar to the one as described in Example 1, was heated to 70° C. within 25 minutes. Then a solution of 42.1 parts of strontium chloride hydrate in 150 parts of water was added thereto. The resulting mixture was stirred at 70° C. for 60 minutes. After adjusting the pH value to 7.6, it was further stirred for an additional 60 minutes to thereby complete the laking. Thus 55.0 parts of a yellowish red monoazo lake pigment was obtained in the form of a powder.

An X-ray diffraction pattern of this pigment was similar to that of the pigment as prepared in Example 1.

Comparative Example 1

The procedure of Example 1 was followed except for the following points. Namely, a dye suspension which was obtained through a diazo coupling reaction similar to the one as described in Example 1 was employed without heating. A solution of 42.1 parts of strontium chloride hydrate in 150 parts of water was added thereto and the resulting mixture was stirred at 0° C. for 60 minutes. After adjusting the pH value to 7.6, the mixture was further stirred for additional 60 minutes to thereby complete the laking. Thus 57.0 parts of a yellowish red monoazo lake pigment was obtained in the form of a powder.

Figure 2:
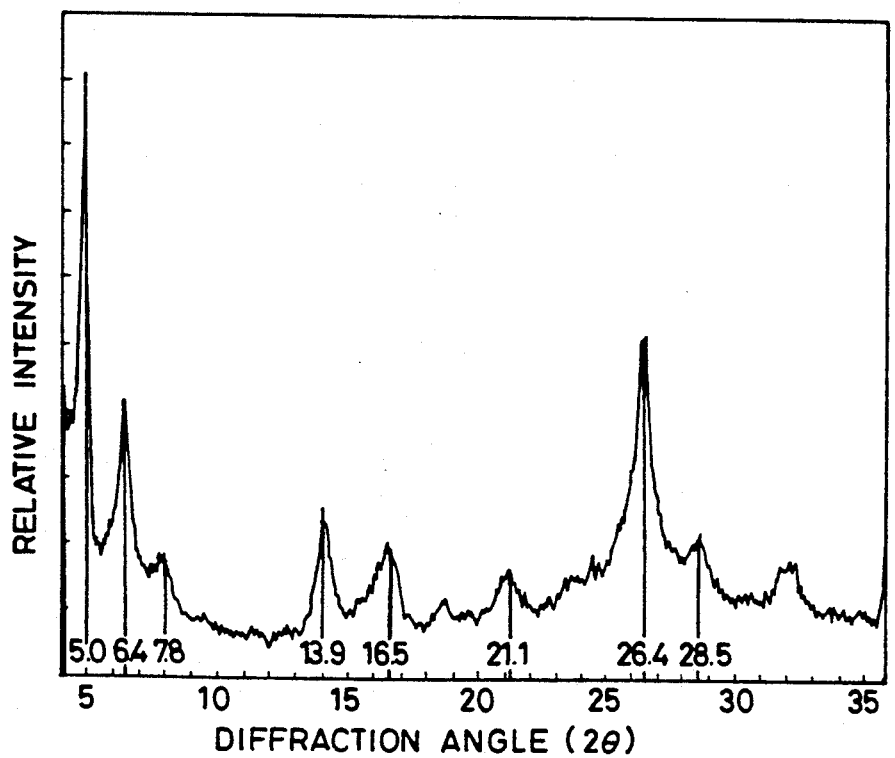
FIG. 2 is an X-ray diffraction pattern ($2\theta \pm 0.2°$; $Cu-K_\alpha$) of the conventional form monoazo lake pigment as obtained in Comparative Example 1.
Figure 4:
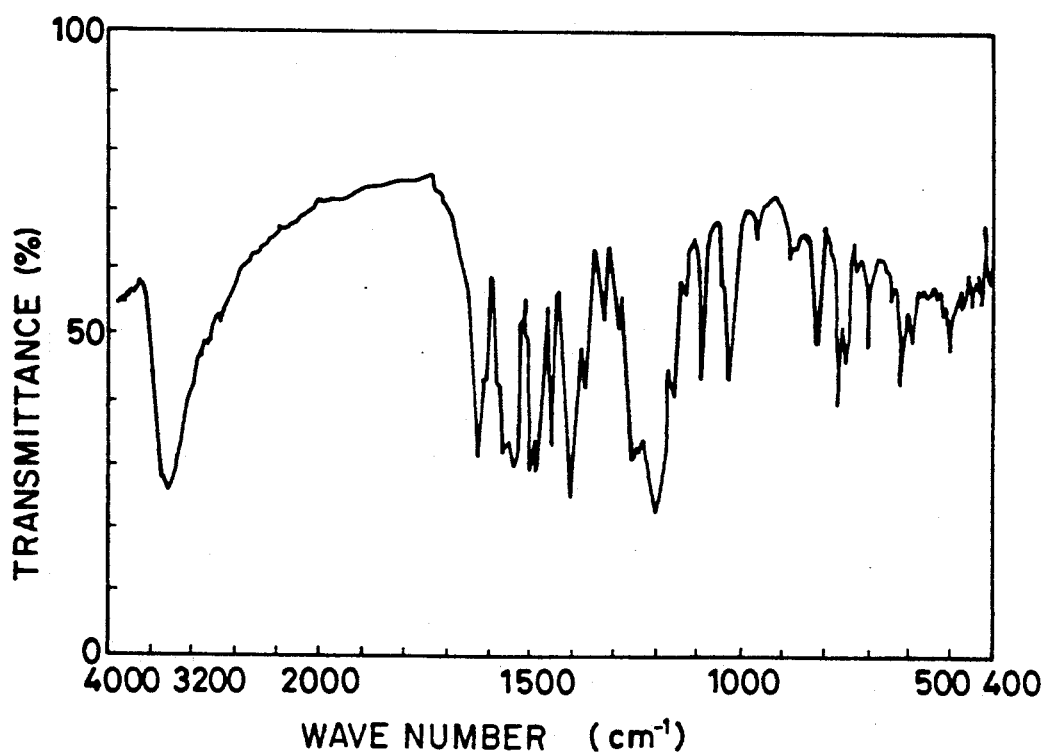
FIG. 4 is an infrared absorption spectrum of the conventional $\alpha$ form monoazo lake pigment as obtained in Comparative Example 1.

As shown in FIG. 2, an X-ray diffraction pattern of this pigment showed a high diffraction intensity at a diffraction angle ($2\theta \pm 0.2°$; Cu—$K_\alpha$) of 5.0°, moderate diffraction intensities at 6.4° and 26.4° and relatively low diffraction intensities at 7.8°, 13.9°, 16.5°, 21.1° and 28.5°. FIG. 4 shows an infrared absorption spectrum of this pigment.

Test Example 1: Print test on litho printing ink 4.0 parts of a pigment obtained in each of Examples 1 to 3 and Comparative Example 1 was milled together with 16.0 parts of ink varnish in a Hoover Automatic muller mixer by repeating mixing at 100 revolutions three times to thereby give an ink. The obtained ink was printed on a sheet of coated paper with the use of a small-scale rotary press (RI tester). The chroma ($C^*$), gloss (60°) and density of the paper thus colored were measured with a spectrophotometer, a glossmeter and a Gretag densitometer (reflection densitometer) respectively. Table 1 shows the results.

TABLE 1

|  | Chroma ($C^*$) | Gloss (60°) | Gretag density |
|---|---|---|---|
| Ex. 1 | 68.0 | 68.3 | 1.69 |
| Ex. 2 | 66.0 | 69.0 | 1.68 |
| Ex. 3 | 63.1 | 67.8 | 1.66 |
| Comp. Ex. 1 | 44.5 | 24.0 | 0.75 |

The inks comprising the pigments of Examples 1 to 3 showed each a high chroma, an excellent gloss and a high density.

Test Example 2: Test on paint 12 parts of a pigment obtained in each of Examples 1 to 3 and Comparative Example, 52 parts of a melamine alkyd resin having a weight ratio of melamine resin to alkyd resin of 3:7, 52 parts of xylene and 120 parts of glass beads were introduced into a polyethylene bottle. The mixture was dispersed with the use of a paint conditioner for one hour and then an additional 50 parts of the melamine alkyd resin were added thereto. The resulting mixture was further dispersed for ten minutes with the paint conditioner. Then the glass beads were filtered off to thereby give a red paint. This paint was spray baked onto a plate and the gloss of the film was measured with a glossmeter. Table 2 shows the results.

TABLE 2

|  | Gloss (60°) |
|---|---|
| Ex. 1 | 90 |
| Ex. 2 | 93 |
| Ex. 3 | 87 |
| Comp. Ex. 1 | 45 |

The paints comprising the pigments of Examples 1 to 3 showed each an excellent gloss.

Test Example 3: Test on fastness to water 12 parts of a pigment as obtained in each of Examples 1 to 3 and Comparative Example or a commercially available calcium lake pigment (C.I. Pigment Red 57:1), 84 parts of an urethane resin, 12 parts of methyl ethyl ketone and 150 parts of steel beads were introduced into a polyethylene bottle. The mixture was dispersed with a paint conditioner for one hour. Then the steel beads were filtered off to thereby give a red ink. This red ink was drawn down on a sheet of nylon film with a 0.15 mm bar coater Then a filter paper was placed onto the colored face of the film and the composite sheet thus formed was sandwiched between two aluminum plates and clipped After boiling in water for one hour, the filter paper was peeled off and the degree of the migration of the pigment thereto was determined by measuring the density with a Gretag densitometer. Table 3 shows the results.

TABLE 3

|  | Gretag density |
|---|---|
| Ex. 1 | 0.02 |
| Ex. 2 | 0.03 |
| Ex. 3 | 0.05 |
| Comp. Ex. 1 | 0.03 |
| C.I. Pigment Red 57:1 | 0.44 |

The inks comprising the pigments of Examples 1 to 3 and Comparative Example were superior to the C.I. Pigment Red 57:1 in fastness to water Test Example 4: Test on fastness to heat A dry color comprising six parts of a pigment as obtained in each of Examples 1 to 3 and Comparative Example 1 and two parts of zinc stearate was blended with 1200 parts of polypropylene. With the use of the resulting blend, a lithograph was formed with an in-line screw injection molding machine (three ounces) at a molding temperature of 280° C. and at a residence time of 0 or 20 minutes. Then the fastness to heat of each pigment was evaluated by measuring the color difference ($\Delta E$). Table 4 shows the results

|  | Color difference ($\Delta E$) |
|---|---|
| Ex. 1 | 1.0 |
| Ex. 2 | 0.8 |
| Ex. 3 | 1.1 |
| Comp. Ex. 1 | 3.5 |

The lithographs colored with the pigments as obtained in Examples 1 to 3 showed each a small color difference and a bright red color and was highly fast to heat.

While the invention has been described in detail and with reference to specific embodiments thereof, it will be apparent to one skilled in the art that various changes and modifications can be made therein without departing from the spirit and scope thereof.

What is claimed is:

1. A monoazo lake pigment of the formula (I):

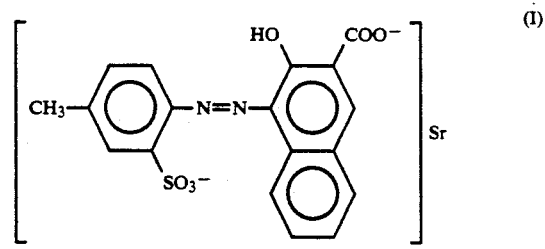

whose X-ray diffraction pattern shows a high diffraction intensity at an diffraction angle ($2\theta \pm 0.2°$; Cu—$K_\alpha$) of 4.9°, moderate diffraction intensities at 18.4°, 25.9° and 26.8° and relatively low diffraction intensities at 11.1°, 15.3° and 21.2°.

2. A monoazo lake pigment as claimed in claim 1 which is obtained by heating a monoazo dye of formula (IV):

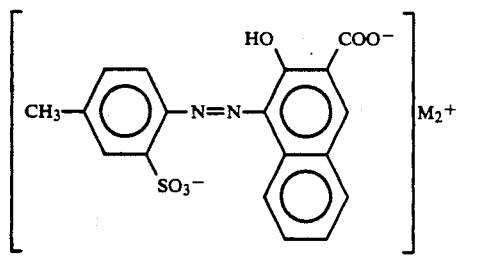

wherein $M_2^+$ represents a sodium, potassium or lithium ion;
and adding an aqueous solution of a strontium salt thereto, and allowing the resulting mixture to react, thus laking the same.

3. A monoazo lake pigment according to claim 2, wherein a monoazo dye of the formula (IV) is heated at a temperature of 20° to 100° C., and a mixture of said monoazo dye and an aqueous solution of a strontium salt is reacted at a temperature of −3° to 90° C.

4. A monoazo lake pigment according to claim 2, wherein a monoazo dye of the formula (IV) is heated and further maintained at a temperature of 23° to 40° C. for 2 to 20 minutes, and a mixture of said monoazo dye and an aqueous solution of a strontium salt is reacted at a temperature of 0° to 40° C.

* * * * *